Jan. 3, 1933. J. P. SYKES ET AL 1,893,456
METHOD OF ERECTING LOCOMOTIVE CABS, CAR BODIES, AND JIGS THEREFOR
Filed March 29, 1932 8 Sheets-Sheet 7

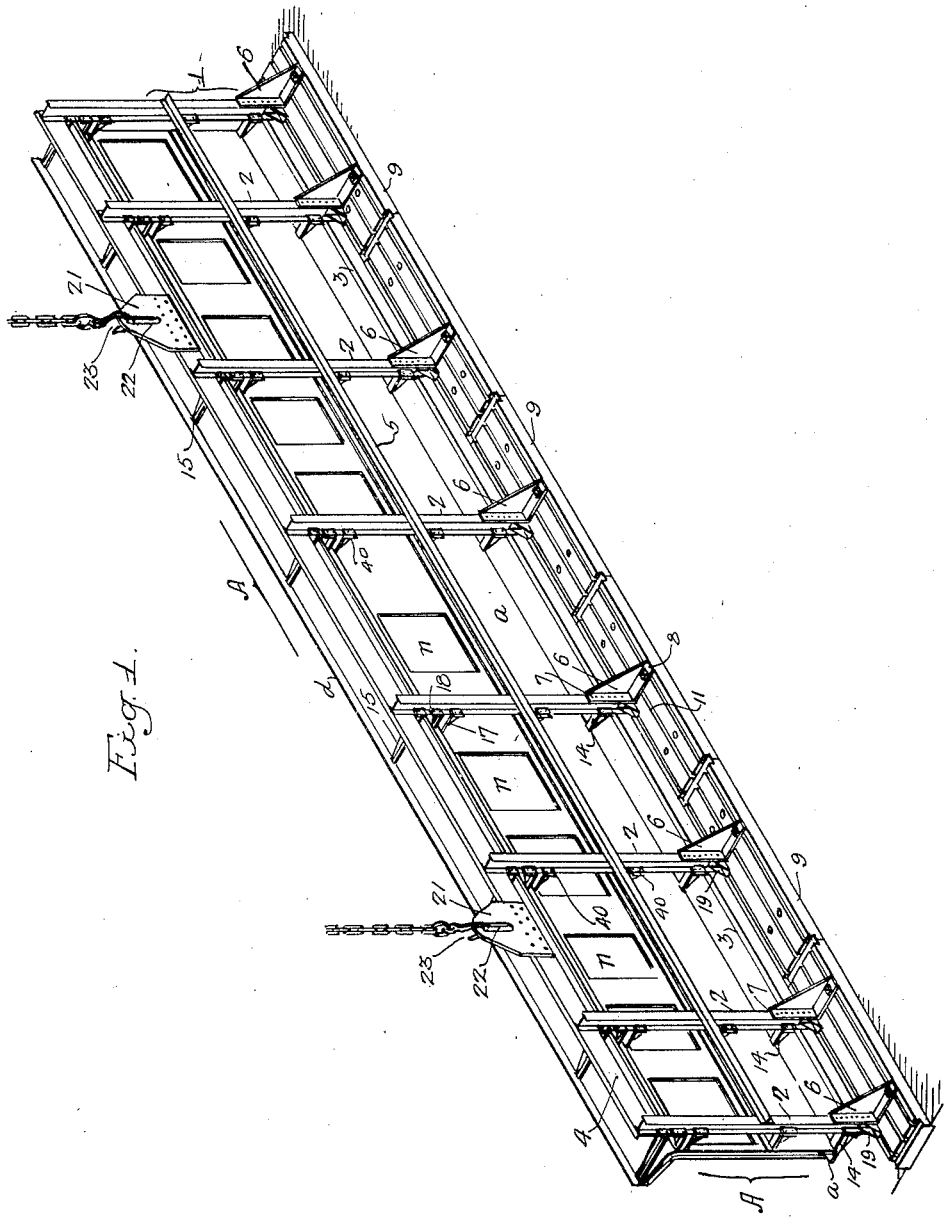

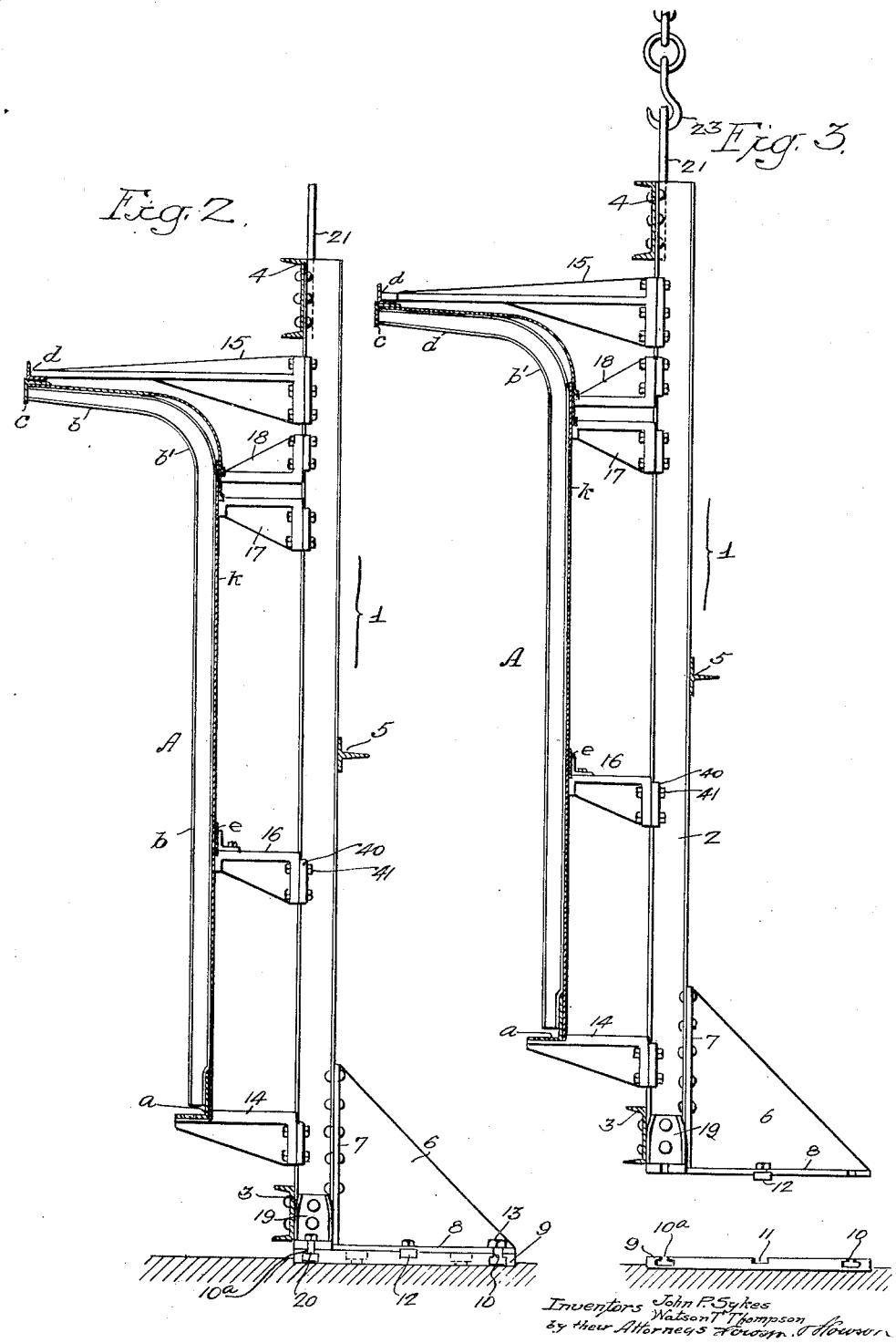

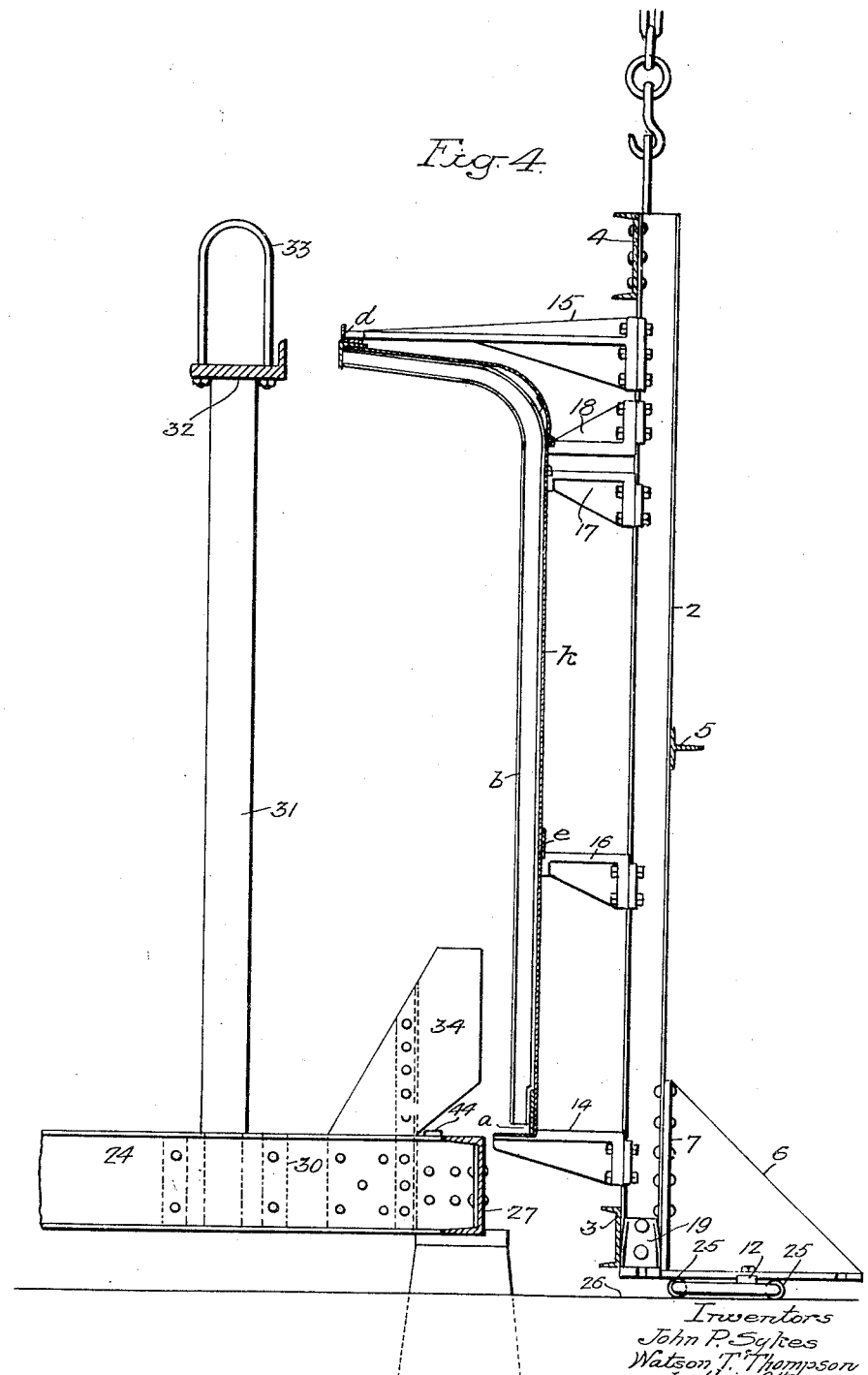

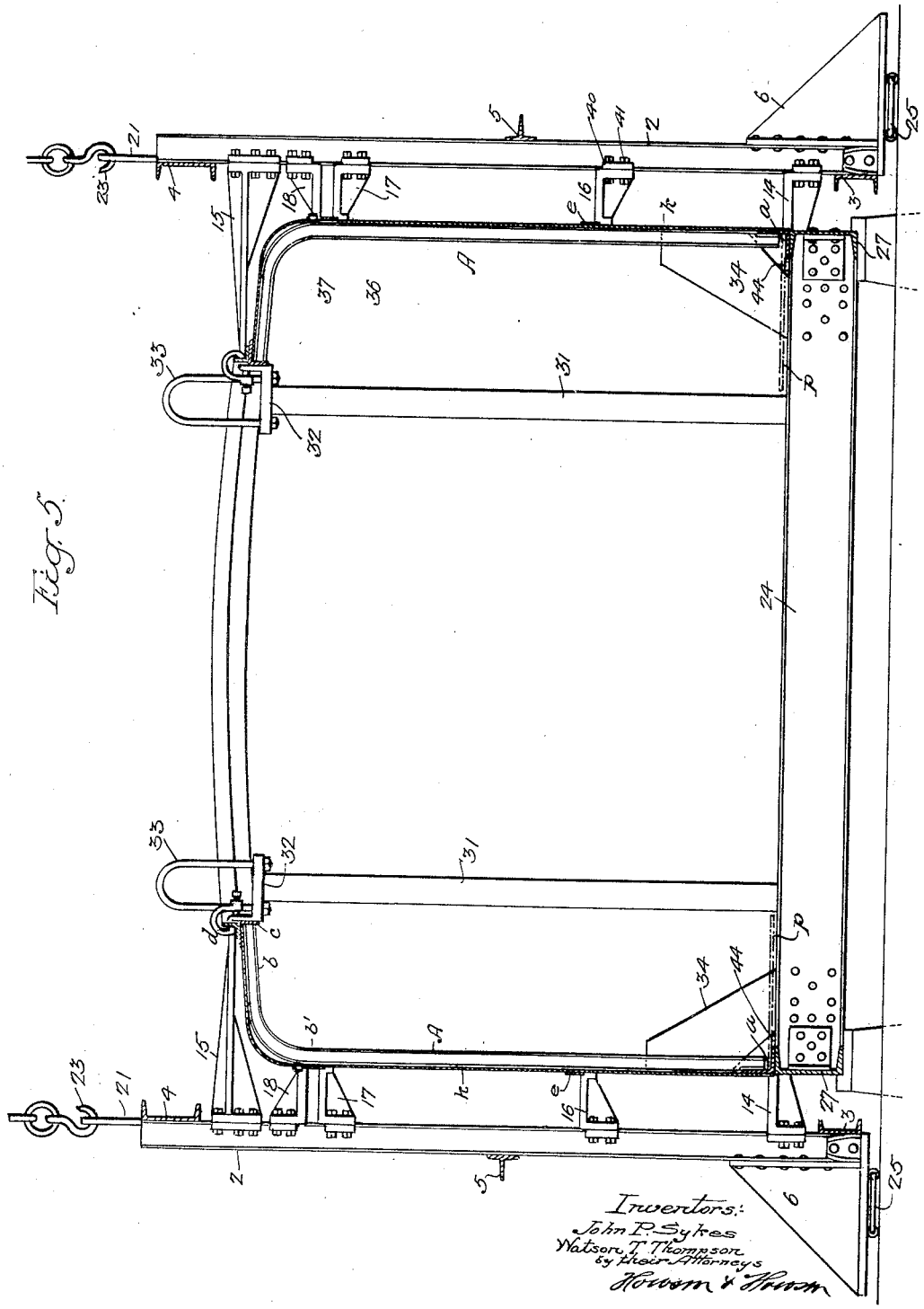

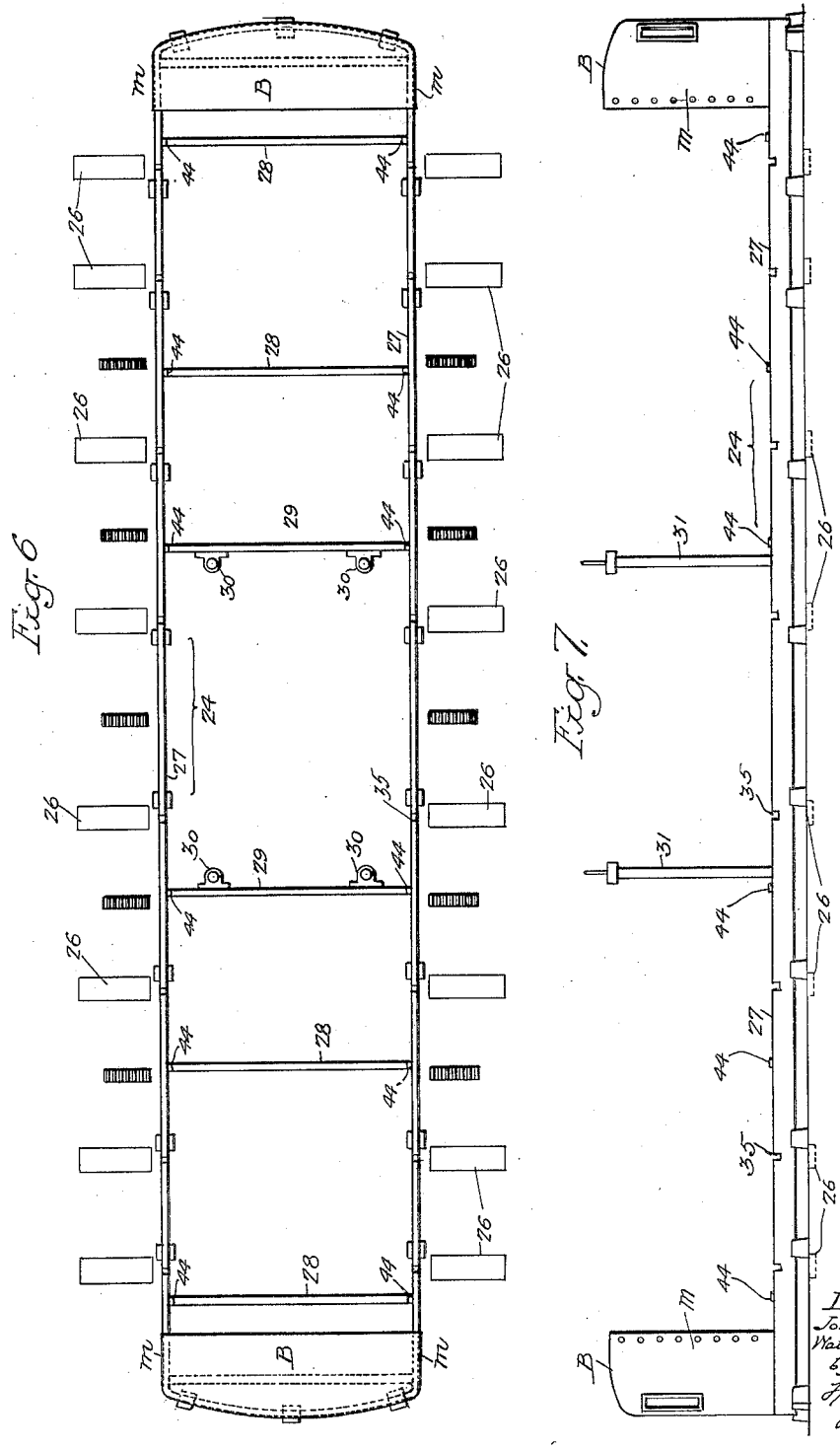

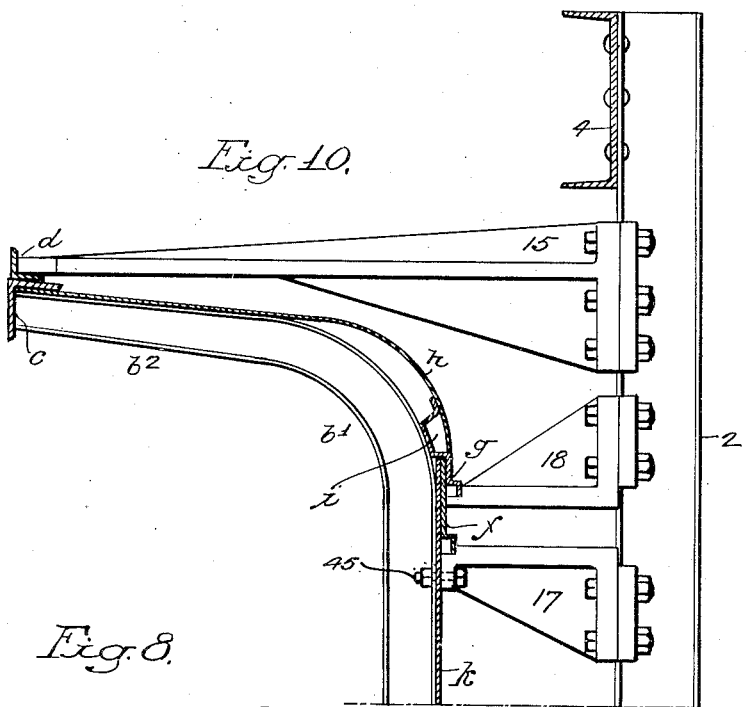
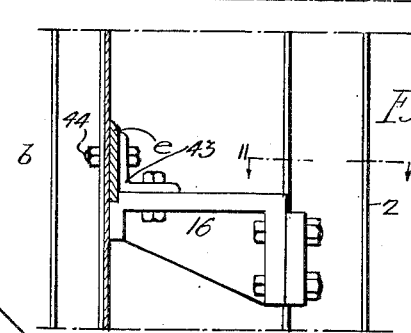
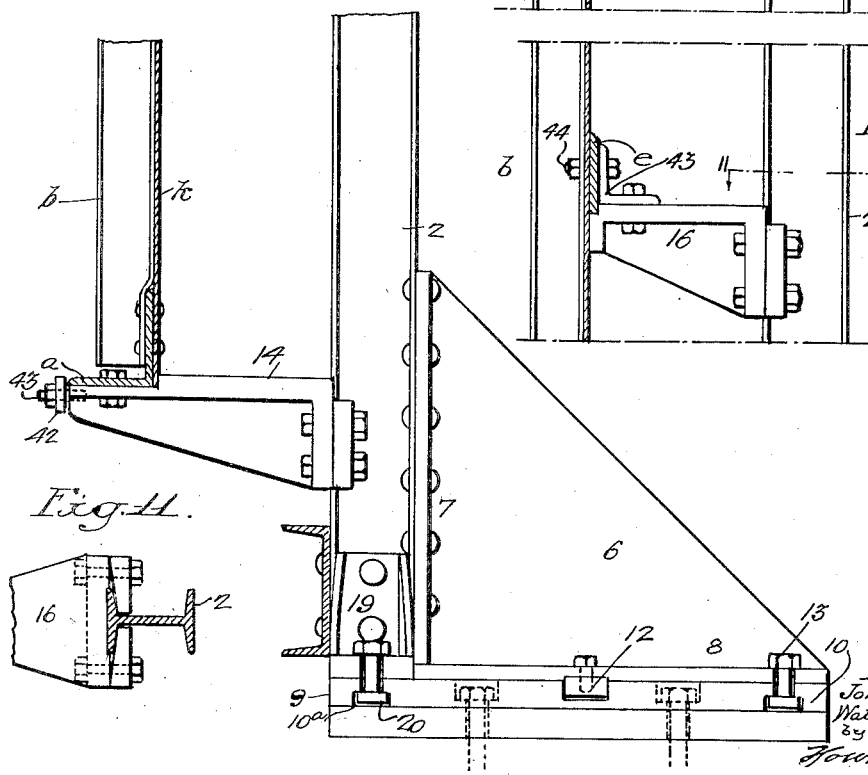
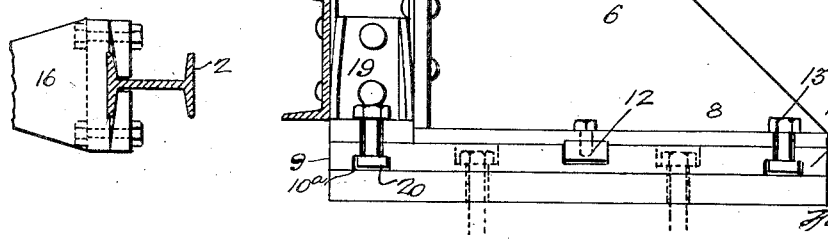

Patented Jan. 3, 1933

1,893,456

UNITED STATES PATENT OFFICE

JOHN P. SYKES, OF WALLINGFORD, AND WATSON T. THOMPSON, OF RIDLEY PARK, PENNSYLVANIA

METHOD OF ERECTING LOCOMOTIVE CABS, CAR BODIES, AND JIGS THEREFOR

Application filed March 29, 1932. Serial No. 601,868.

This invention relates to certain improvements in the process and means of erecting car bodies, and particularly the bodies or cabs of electric locomotives. These cabs are of considerable length, and are mounted on a base frame and enclose all mechanism of an electric locomotive, as well as the compartments for the operator.

The electric locomotive cabs are now preferably made of aluminum in order to reduce the weight of the locomotive, and great care has to be exercised in handling the side members of the cab in order to prevent buckling and injury to the side members.

One object of our invention is to provide a jig upon which the side members of the cab are assembled, and to properly support each assembled side member until it is secured to the end members of the cab and mounted on a temporary base frame.

A further object of our invention is to prevent the side members of the cab, as well as other parts of the cab, from being distorted or buckled from the time the plates of the side frame are located on jigs until the completed cab is mounted on the base frame of the locomotive.

These objects we attain by making the jig portable and to elevate the jig by a suitable crane with the assembled side member attached thereto and transported to a position at the side of a temporary base frame on which the end members of the cab have been previously assembled. Then the jig with the assembled side members is located in position at the side of the temporary base frame, and bodily moved so that the assembled side frame is in position on the base frame, so that it can be secured to the end members of the cab and after the assembling of the cab is completed on the temporary frame, the entire cab is removed from the temporary base frame and mounted on the permanent base frame of the locomotive.

It will be understood at the outset that while our invention is particularly adapted for assembling cabs of electric locomotives, the invention can be used in assembling any type of car body without departing from the essential features of the invention.

In the accompanying drawings:

Fig. 1 is a perspective view showing our improved jig with the side member of a locomotive cab assembled thereon, and showing the hooks of a crane in position to lift the jig with the side member after the jig has been detached from the base plates;

Fig. 2 is a sectional elevation of the jig showing the assembled side of a cab mounted thereon;

Fig. 3 is a view showing the jig separated from the base plates and elevated by a crane in position to be transferred to the side of a temporary base frame;

Fig. 4 is a sectional view of the temporary base frame and the jig carrying a side member of a locomotive cab, the jig being located at the side of the base frame and upon rollers so that it can be moved into position on the base frame;

Fig. 5 is a transverse sectional view through the base frame and the side frames, showing two jigs carrying the side members of the cab moved into position with the side members of the cab mounted on the base frame;

Fig. 6 is a plan view of the temporary base frame showing the end members of the cab in position thereon;

Fig. 7 is a side view of the temporary base frame with the end members of the cab in position thereon ready to receive the side members of the cab;

Fig. 8 is an enlarged sectional view of the lower portion of the jig with the side member of the cab resting upon the lower bracket and secured thereto;

Fig. 9 is a view of the belt rail of the cab resting on a bracket of the jig and secured thereto;

Fig. 10 is a view of the upper portion of the jig, showing the letter-board and the side eaves of the roof of the side member of the cab resting on brackets and an extended bracket which projects over the roof of the assembled side member so as to locate the angle bar at the edge of the roof in proper position;

Fig. 11 is a sectional plan on the line 11—11, Fig. 9;

Figure 13:
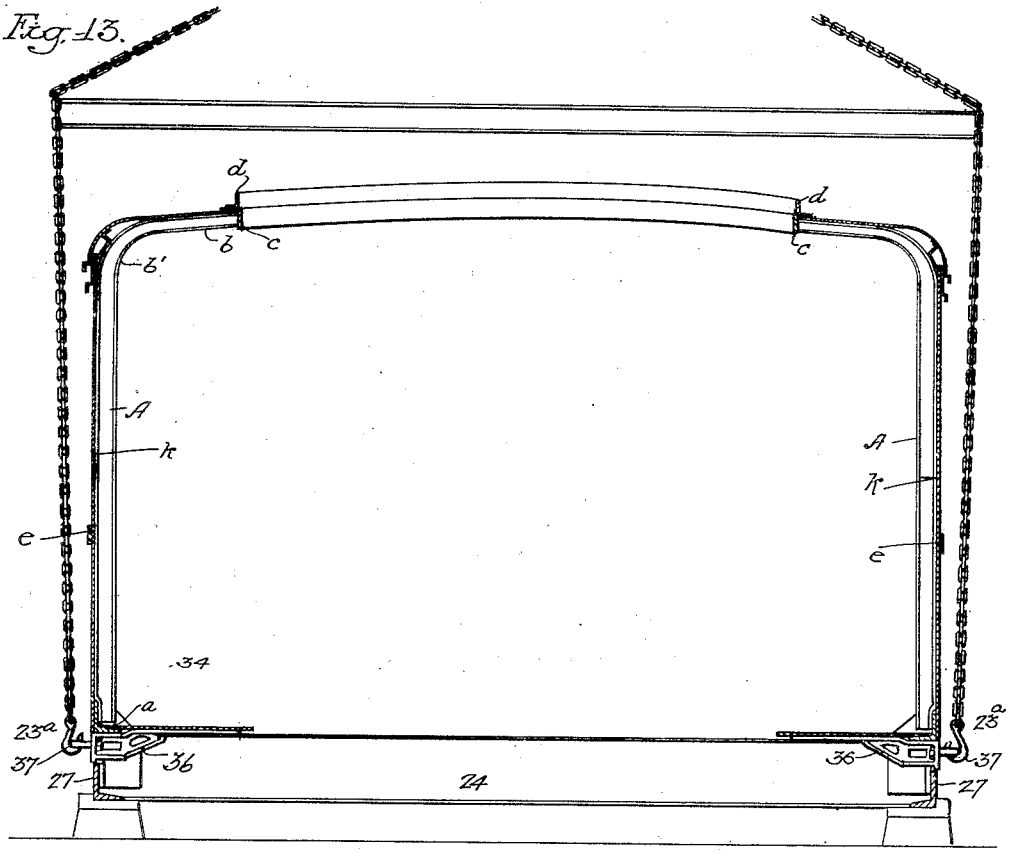
Fig. 13 is a transverse sectional view of the temporary base frame and the completely assembled cab, ready to be transferred from the temporary base frame to the locomotive base frame.
Figure 12:
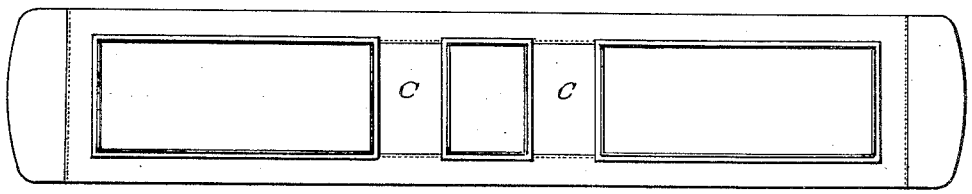
Fig. 12 is a plan view of the assembled cab showing the transverse members of the roof structure connecting the side members between hatches.

Referring to the drawings, 1 is the jig, which consists of a series of vertical members 2 and a longitudinal channel bar 3, an upper longitudinal channel bar 4, and an intermediate longitudinal T-bar 5, which form with the vertical member 2 the skeleton frame of the jig. At the lower end of each vertical member 2 is a foot plate 6. Each foot plate in the present instance is angular in shape, one member 7 of the plate being rigidly secured to the vertical member 2, while the other member 8 of the plate rests upon a base plate 9. The base plates 9 are permanently mounted in the floor of the erecting shop. Each base plate has two undercut longitudinal grooves 10—10a therein in the present instance, and a central longitudinal aligning groove 11. Blocks 12 on the underside of the member 8 of the foot plate fit the central longitudinal groove 11 in the base plate and bolts 13, having heads which are adapted to the undercut longitudinal groove 10 in each base plate, securing the foot plate temporarily in position on the base plate.

At each side of each vertical member 2 are braces 19, which are rigidly secured to the vertical members and are detachably secured by bolts 20 to the base plates 9, the heads of the bolts 20 being located in the undercut grooves 10a in the base plate.

Projecting from each vertical member 2, in the present instance, are a series of brackets, which can be adjusted vertically on the said vertical members to accommodate different types of side members of a cab or car body. The base of each bracket is wider than the vertical member 2 of the jig to which it is secured. Clamp blocks 40 extend back of the flanges of the vertical member 2, and bolts 41 pass through the base of the bracket and through the clamp blocks, firmly holding the bracket in position. By this means the brackets can be adjusted vertically on the jig and held rigidly after adjustment, as clearly shown in Figs. 1, 8, 9, 10 and 11. Each bracket 14 is notched at its outer end, forming a seat for the lower longitudinal angle bar "a" of the assembled side member "A" of the cab. The angle bar "a" is held against a shoulder at the inner end of the seat by a clamp plate 42 mounted on a stud bolt 43, Fig. 8; thus the bar "a" is held in position, as it is essential that the angle bar be held firmly, as the balance of the side member of the cab is aligned with this angle bar "a". Secured to the longitudinal angle bar "a" are the posts "b", which are curved at their upper ends as at b—1, and are extended at b—2. The extensions b—2 are connected at their inner ends by a longitudinal angle bar "c" which forms one side of the roof hatches and acts as a longitudinal brace for the roof of the cab. Secured to the angle bar "c" are short angle bars "d" which, with the transverse angle bar described hereinafter, form the raised flanges which surround the hatches in the roof of the cab, and which are closed by hatch covers which overlap the vertical flanges of the bars "d".

The upper bracket 15 is extended over the roof of the side member and acts as a gauge for aligning the angle bar "c" and the angle bar "d". The bracket 16 is notched at its outer end and is positioned to support the belt rail "e" of the side member of the cab. An angle plate 43 is bolted to the upper face of the bracket 16 and is secured to the belt rail by bolts 44, Fig. 9. The bracket 17 is so located as to support the letter-board "f" and is secured to the cab structure by temporary bolts 45. The bracket 18 is arranged to support the lower edge of the side eaves "g" of the roof "h". The eaves in the present instance are formed by a plate "i", which is shaped so as to space the room member "h" away from the curved portion b—1 of the post "b". The roof plate "h" extends over the portion b—2 of the post "b" and is secured thereto and to the angle bar "c".

"k" are the plates of the side member of the cab body, and "n" are the window openings. At the upper end of the jig 1 are eye-plates 21. These plates are firmly secured to the upper longitudinal channel member 4 in the present instance and each plate has an eye 22 for the hooks 23 of the hoisting tackle of a hoist, not shown. After the parts of the side member of the cab have been completely assembled on the jig and temporarily secured thereto, the hooks of the crane engage the eye-plates of the jig, after which the bolts 13 and 20, which secure the jig to the base plate, are removed to free the jig from the base plates. Then the jig with the side member "A" of the cab body is elevated by the crane, as shown in Fig. 3, clear of the base plates and is transferred to a position at the side of the temporary base frame 24, Fig. 4, the base brackets 6 resting upon rollers 25 which are located on blocks 26 in the floor of the erecting shop.

The temporary base frame 24 is rectangular in form, the ends being curved to correspond to the curve of the end sections B—B of the cab body. The side bars 27 of the temporary frame extend the full length of the frame and are connected at intervals by cross-braces 28 and 29. Secured to the cross-braces 29 are sockets 30 for posts 31, which have flanged plates 32 at their upper ends, the flanges of which are clamped against the flanges "c" of the side members "A", when in position as shown in Fig. 5 to hold the upper portion of each side frame in proper alignment.

At the upper ends of the posts are U-shaped rods 33, which form loops to be engaged by the hook of a crane when the post is to be removed from the base frame 24, after the cross-braces are secured in position, tying the upper portions of the side frames together. After the jig which carries the side frame has been moved from the position shown in Fig. 4 to the position shown in Fig. 5 by pinch bars in the present instance, the side member is secured by temporary bolts to the side sections m—m of the end frames "B" of the cab and to brackets 34 projecting from the temporary base frame, and the lower angle bar "a" is also secured temporarily to the temporary base frame 24. In order to allow the jig to move into position with the side members of the cab in alignment with the end members, the side frames 27 of the base frame 24 are notched as at 35 to allow the lower bracket 14 of the jig to carry the side member of the cab into position above the temporary base frame and against stop lugs 44.

In the present construction the cab has a series of hatches in the roof to allow for the insertion or removal of the mechanism of the locomotive, and after the side frames have been temporarily secured in position on the temporary base frame and to the end members of the cab, permanent transverse roof sections "C" are secured in position and extend from the upper edge of one side member to the other and are securely bolted in position. The spaces between these permanent roof sections form hatches which are closed by hatch covers (not shown) which overlap the angle bar "d" at the upper edge of the roof sections. These hatch covers can be removed when it is necessary to repair or rearrange the mechanism of the locomotive.

Figure 14:
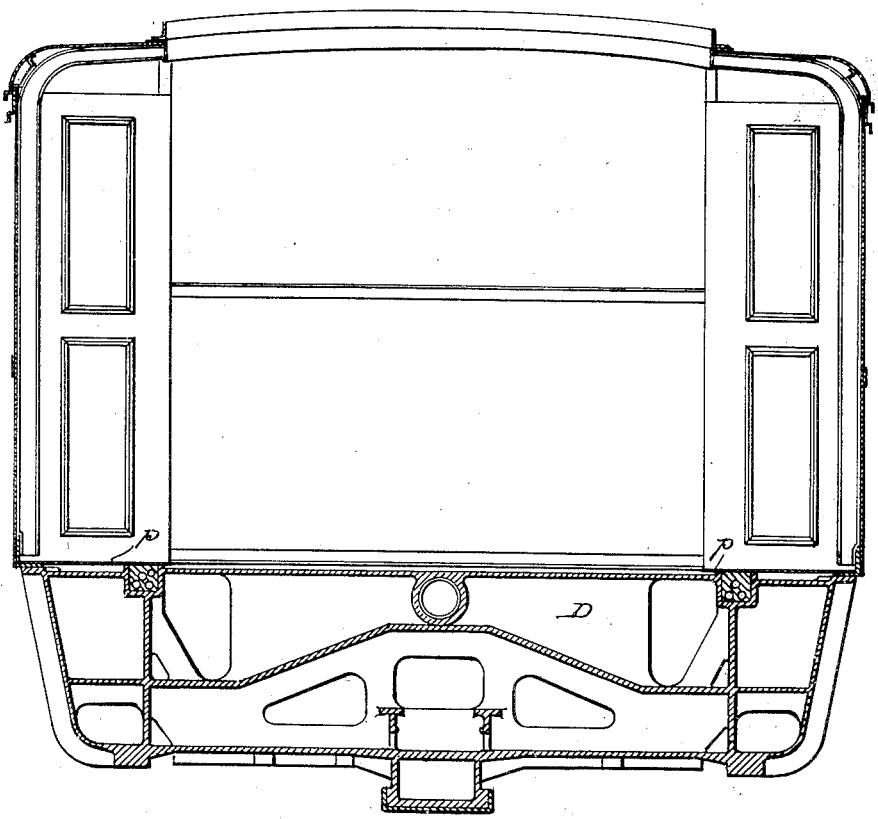
Fig. 14 is a transverse sectional view showing the cab mounted on the locomotive base frame.

After the permanent roof sections have been placed in position and the side members "A" have been permanently secured to the end members "B" of the cab body and the side floor plates and other permanent fixtures are in position, the posts 31 are removed as the permanent roof sections "C" and the end sections B—B will properly support the upper ends of the side members. The jig is then detached from the side members A of the cab and the crane lifts the jig off of the rollers and returns the jig to the assembling floor. It is then bolted to the base blocks 9 ready to have another side frame assembled thereon. After the erection of the cab structure on the temporary base frame has been completed, the entire cab is raised clear of the temporary base frame 24 and transferred to the permanent frame D of the locomotive, and is then permanently secured to the locomotive frame, Fig. 14.

In the present instance, bolster brackets 36 are secured to the under side of the cab body and are provided with eyes 37 to which are attached the hooks 23a of hoisting chains, Fig. 13 of a crane (not shown). The crane lifts the entire cab body off of the the temporary base frame 24 and carries it above the permanent frame D of the locomotive and lowers it in position so that it can be bolted or otherwise secured to the said locomotive frame, Fig. 14. The locomotive frame is shown as an integral casting, but it will be understood that the frame may be made in any manner without departing from the essential features of the invention.

As the cab structure is made of aluminum, great care has to be exercised in handling the side members of the cab, and by the above described method the aluminum plates are kept from buckling and distortion and can be readily located in position on the jig, and when the entire side frame has been assembled on the jig, it is rigidly held by the jig, preventing buckling or injury to the plates which make up the side members of the cab body.

The essential feature of the invention is the use of jigs which can be detached from their bases, and on which the side frames of the cab body are assembled, so that the jig retains the entire side member in alignment without buckling until the side frames are secured to the end frames on the temporary base frame, and the permanent roof sections are secured in position, after which these jigs can be detached and withdrawn from the side members of the cab frame and returned to position above their base plates 9 in the erecting floor. These are then rigidly bolted to the base plates to allow another side frame to be assembled thereon. This invention is particularly adapted for assembling side frames of cab bodies made of aluminum plates, which are very flexible and are liable to buckle while being assembled, and even after the side members have been completed by the above described method, the individual plates, as well as the entire side members, are held rigidly by the jigs until the cab body has been completely assembled on the temporary base frame, after which it is bodily removed from the temporary base frame and mounted permanently on the locomotive base frame.

We claim:

1. The process herein described, of assembling cab bodies of electric locomotives, said process consisting in assembling the plates of the side members of the cab body on a jig which is detachably secured to base plates, and after the plates of the side frame have been assembled, detaching the jig from the base plates, lifting the jig, with the assembled side frame secured thereto, bodily to a point at the side of a temporary base frame, then moving the jig towards the temporary base frame so as to position the side member of the cab in position on the temporary base frame, on which end members of the cab body have been previously mounted, securing the side members to the end members of the cab body, and after both side members of the cab body have been mounted on the temporary frame, securing transverse permanent roof sections to the assembled body so as to tie the two side frames together midway between their ends, and after the cab body has been completed, lifting the entire cab body off of the temporary frame and transferring it to the permanent base frame of an electric locomotive, to which it is permanently secured.

2. The process herein described, of assembling car bodies, said process consisting in assembling the parts of the side frames of a car body on a jig which is detachably secured to base plates, and after the assembly of the side frame has been completed, detaching the jig on which the side frame is mounted, from its base plates, lifting the jig with the assembled side frames attached thereto, bodily to the point at the side of a base frame, and moving the jig with the assembled side member in position so as to locate the side members on the base frame, securing the side frames on the base frame, detaching the jig from the assembled side frame and returning the jig to its first position on its base plates, to which it is secured.

3. The process herein described, of assembling car bodies, said process consisting in assembling the parts of the side frames of a car body on a jig which is detachably secured to base plates, after the parts have been assembled on the jig, detaching the jig on which the side frame is mounted, and bodily lifting the jig with the assembled side frame attached thereto, to a point where it is attached to the end members of the car body, then detaching the jig from the assembled side frame and returning the jig to its first position.

4. The combination in means for assembling the side frames of car bodies, of a jig on which a side of a car body is assembled; a foundation; and means for detachably securing the jig to the foundation, said jig having means by which it can be elevated by a crane with the assembled car body, and transported to a base frame to which it is secured.

5. The combination in means for assembling the side of a car body, of a jig extending the full height of the car body and having means for supporting certain longitudinal members of the side of the car body while being assembled; a foundation; means for detachably securing the jig to the foundation, said jig having means by which the jig and the assembled side of the car body can be bodily raised when detached from the foundation, and transported to the side of a base frame; a series of rollers at the said base frame on which the jig can rest when located at the side of the frame, so that the jig with the side frame can be bodily moved so as to bring the side frame in position above the base frame and attached to said frame.

6. The combination in means for assembling side frames of car bodies, of a jig consisting of a series of uprights having brackets thereon on which certain longitudinal elements of the sides of the car body can rest; a series of extended bases for the jig; a foundation; means for detachably securing the bases of the jig to the foundation; eye plates at the upper portion of the jig for the hooks of a crane, the jig and the assembled side frame being supported by the crane, after the jig has been detached from the foundation.

7. The combination in means for assembling side frames of car bodies, of a jig consisting of a series of uprights having brackets thereon on which certain longitudinal elements of the sides of the car body can rest; a series of extended bases for the jig; a foundation; means for detachably securing the bases of the jig to the foundation; eye plates at the upper portion of the jig for the hooks of a crane, the jig and the assembled side frame being supported by the crane after the jig has been detached from the foundation; and rollers at a car base frame on which the bases of the jig can rest so that when the jig with the side frame is moved towards the car base frame, the side frame can be secured to said car base frame.

8. The combination in a jig for assembling the sides of car bodies, of a series of uprights; a base for each upright; a foundation; and means for securing the bases of the uprights to said foundation; brackets projecting from the said uprights, the lower brackets supporting the lower portion of the frame of the car body, the second bracket arranged to support the belt rail, the third series of brackets arranged to support the letter board and the fourth series of brackets arranged to support the eaves of the roof of the side of the car body, and an upper series of brackets extending over the side of the car body against which the roof rail is held while the car and a portion of the roof are being assembled.

9. The combination in a jig for assembling the sides of car bodies, of a series of uprights; a base for each uprght; a foundaton; and means for securing the bases of the uprights to said foundation; brackets projecting from the said uprights, the lower brackets supporting the lower portion of the frame of the car body, the second bracket arranged to support the belt rail, the third series of brackets arranged to support the letter board and the fourth series of brackets arranged to support the eaves of the roof of the side of the car body, and an upper series of brackets extending over the side of the car body against which the roof rail is held while the car and a portion of the roof are being assembled; a plate adjustably secured to the end of each lower bracket for clamping the lower member of the frame in proper alignment.

10. The combination in means for assembling the side members of a cab body of an electric locomotive, of a jig extending the full height of the cab body and having means for supporting certain longitudinal members of the side of the cab body while being assembled; a foundation on which the jig is detachably mounted, said jig having means by which the jig and the assembled side of the cab body can be bodily raised when the jig is detached from the foundation and transported to the side of a temporary base frame, said base frame having stop lugs some distance from the edge of the frame, so that when the jig and the side frame of the cab body is moved into position, the lower member of the cab body will come in contact with the stop lugs, so as to bring the side frame in proper alignment; end members of the cab mounted on the temporary frame and to which the side frames are attached, so that when the jig is detached from the side frames it can be returned to its first position.

11. The combination in means for assembling side members of a cab body, of a jig having means supporting certain longitudinal members of the side of the cab body while being assembled; a foundation upon which the jig is detachably mounted, so that it can be bodily raised and detached from the foundation and transported to the side of a temporary base frame; a temporary base frame on which the ends of the cab body are mounted; detachable posts projecting upwardly from the temporary base frame, said posts having plates to which the upper portions of the cab body are detachably secured, said posts being removed after the two side frames of the cab have been connected by transverse roof sections.

JOHN P. SYKES.
WATSON T. THOMPSON.